US010442983B2

(12) United States Patent
Sayed et al.

(10) Patent No.: US 10,442,983 B2
(45) Date of Patent: Oct. 15, 2019

(54) MITIGATION OF CONDENSATE BANKING USING SURFACE MODIFICATION

(71) Applicant: Saudi Arabian Oil Company, Dhahran (SA)

(72) Inventors: Mohammed Sayed, Houston, TX (US); Feng Liang, Cypress, TX (US); Hooisweng Ow, Woburn, MA (US); Jason Cox, Ashland, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/038,692

(22) Filed: Jul. 18, 2018

(65) Prior Publication Data

US 2019/0023973 A1   Jan. 24, 2019

Related U.S. Application Data

(60) Provisional application No. 62/534,927, filed on Jul. 20, 2017.

(51) Int. Cl.
| | | |
|---|---|---|
| *C09K 8/584* | (2006.01) | |
| *C09K 8/588* | (2006.01) | |
| *E21B 43/25* | (2006.01) | |
| *C09K 8/524* | (2006.01) | |
| *C09K 8/60* | (2006.01) | |

(52) U.S. Cl.
CPC .............. *C09K 8/588* (2013.01); *C09K 8/524* (2013.01); *C09K 8/584* (2013.01); *C09K 8/60* (2013.01); *E21B 43/25* (2013.01); *C09K 2208/10* (2013.01); *C09K 2208/22* (2013.01)

(58) Field of Classification Search
CPC .... C09K 8/584; C09K 2208/10; C09K 8/602; C09K 8/685; C09K 8/80; C09K 15/06; C09K 15/10; C09K 15/18; C09K 15/22; C09K 15/26; C09K 15/28; C09K 15/30; C09K 8/588; C09K 8/68; C09K 8/805; C09K 8/86; C09K 8/885; C09K 8/887; C09K 8/90; C09K 2208/12; C09K 2208/22; C09K 2208/24; C09K 2208/28; C09K 2208/30; C09K 2208/32; C09K 8/524; C09K 8/60; C09K 8/62; C09K 8/665; C09K 8/70; C09K 8/703; C09K 8/706; C09K 8/74; C09K 8/845; C09K 8/882; C09K 8/92; C09K 8/94
See application file for complete search history.

(56) References Cited

U.S. PATENT DOCUMENTS

| | | | |
|---|---|---|---|
| 6,559,087 B1 | 5/2003 | De Lange et al. | |
| 6,683,022 B1 | 1/2004 | De Lange et al. | |
| 6,865,939 B2 | 3/2005 | Kirby et al. | |
| 7,029,507 B2 | 4/2006 | Yadav et al. | |
| 8,252,778 B2 | 8/2012 | Yu et al. | |
| 9,245,848 B2 | 1/2016 | Duong et al. | |
| 9,296,839 B2 | 3/2016 | Venema et al. | |
| 9,587,307 B2 | 3/2017 | Haukka et al. | |
| 2004/0157749 A1 | 8/2004 | Ely et al. | |
| 2007/0207068 A1 | 9/2007 | Lange et al. | |
| 2007/0249164 A1 | 10/2007 | Chen et al. | |
| 2008/0157665 A1 | 7/2008 | Wu et al. | |
| 2009/0004462 A1 | 1/2009 | Zhang et al. | |
| 2009/0130412 A1 | 5/2009 | Hatton et al. | |
| 2009/0317621 A1 | 12/2009 | Youngblood et al. | |
| 2010/0096139 A1* | 4/2010 | Holcomb ............... | C09K 8/536 166/308.1 |
| 2010/0285999 A1* | 11/2010 | Norman .................. | C09K 8/52 507/240 |
| 2011/0003402 A1 | 1/2011 | Chakrapani et al. | |
| 2011/0053810 A1 | 3/2011 | Norman et al. | |
| 2012/0128882 A1 | 5/2012 | Mirkin et al. | |
| 2014/0238263 A1 | 8/2014 | Scheonfisch et al. | |
| 2015/0315455 A1* | 11/2015 | Sayed .................... | C09K 8/524 166/305.1 |
| 2015/0322272 A1 | 11/2015 | Pokroy et al. | |
| 2016/0114325 A1 | 4/2016 | Tang et al. | |
| 2016/0357101 A1 | 12/2016 | Mirkin et al. | |
| 2017/0000119 A1 | 1/2017 | Nassar et al. | |

FOREIGN PATENT DOCUMENTS

| | | |
|---|---|---|
| WO | WO-98/50945 A2 | 11/1998 |
| WO | WO-2010/009182 A2 | 1/2010 |
| WO | WO-2011/001036 A1 | 1/2011 |
| WO | WO-2011/086361 A1 | 7/2011 |
| WO | WO-2013/071212 A1 | 5/2013 |
| WO | WO-2015/171596 A1 | 11/2015 |
| WO | WO-2016/073658 A1 | 5/2016 |

(Continued)

OTHER PUBLICATIONS

M.A. Mousavi et. al., Synthesis of fluorinated nano-silica and its application in wettability alteration near-wellbore region in gas condensate reservoirs, Applied Surface Science 273 (2013) 205-214.*

M. Ahmadi et. al., Chemical treatment to mitigate condensate and water blocking in gas wells in carbonate reservoirs, SPE Production & Operations, Feb. 2011, pp. 67-73.*

Ahmadi, A. et al., Chemical Treatment to Mitigate Condensate and Water Blocking in Gas Wells in Carbonate Reservoirs, SPE Production & Operations, 67-74 (Feb. 2011).

Al-Yami, A.M. et al., A Successful Field Application of a New Chemical Treatment in a Fluid Blocked Well in Saudi Arabia, Society of Petroleum Engineers International, presentation at the SPE Saudi Arabia section Annual Technical Symposium and Exhibition, Khobar, Saudi Arabia, SPE 168086: 1-8 (May 19-22, 2013).

Fahes, M. et al., Wettability Alteration to Intermediate Gas-Wetting in Gas-Condensate Reservoirs at High Temperatures, SPE Journal, 397-407 (2007).

(Continued)

*Primary Examiner* — Kumar R Bhushan
(74) *Attorney, Agent, or Firm* — Choate, Hall & Stewart LLP; Charles E. Lyon; Su Kyung Suh

(57) ABSTRACT

The present application relates to methods and systems for mitigating condensate banking. In some embodiments, the methods and systems involve altering the wettability of a rock formation in the vicinity of a wellbore for a gas condensate reservoir.

24 Claims, 4 Drawing Sheets

(56) References Cited

FOREIGN PATENT DOCUMENTS

| WO | WO-2016/090368 A1 | 6/2016 |
| WO | WO-2019/018507 A1 | 1/2019 |

OTHER PUBLICATIONS

Karandish, G.R. et al., Wettability alteration in gas-condensate carbonate reservoir using anionic fluorinated treatment, Chemical Engineering Research and Design, 93: 554-564 (Feb. 2015).

Li, K. et al., Phenomenological Modeling of Critical Condensate Saturation and Relative Permeabilities in Gas/Condensate Systems, SPE Journal, 5(20): 138-147 (Jun. 2000).

Mousavi, M.A. et al., Synthesis of fluorinated nano-silica and its application in wettability alteration near-wellbore region in gas condensate reservoirs, Journal of Applied Surface Science, 273: 205-214 (2013).

Noh, M. et al., Wettability Alteration in Gas-Condensate Reservoirs to Mitigate Well Deliverability Loss by Water Blocking, SPE Reservoir Evaluation & Engineering, 676-685 (Aug. 2008).

Sayed, M. et al., A Safer Generation of Wettability Alteration Chemical Treatments, SPE International Conference on Oilfield Chemistry, SPE-184566-MS, 1-25 (Apr. 3-5, 2017).

International Search Report for PCT/US2018/042657, 6 pages (dated Oct. 15, 2018).

Written Opinion for PCT/US2018/042657, 8 pages (dated Oct. 15, 2018).

\* cited by examiner

| | CONTACT ANGLE AT TREATED SANDSTONE (° DEGREE) |
|---|---|
| DECANE ON TREATED SANDSTONE WITH 135 nm NPs | 61.10 ± 1.24 |
| DECANE ON TREATED SANDSTONE WITH 180 nm NPs | 27.08 ± 2.0 |

FIG. 2

MITIGATION OF CONDENSATE BANKING USING SURFACE MODIFICATION

CROSS REFERENCE TO RELATED APPLICATIONS

This application claims the benefit of U.S. Provisional Patent Application No. 62/534,927, filed Jul. 20, 2017, the contents of which are hereby incorporated by reference herein in their entirety.

FIELD

The present application relates generally to methods and systems for mitigating condensate banking.

BACKGROUND

Gas condensate reservoirs contain an appreciable amount of gas and liquid condensate reserves that are vital for the increasing global demand for energy resources. In gas condensate reservoirs, the initial reservoir pressure is usually greater than the dew point pressure where there is only one phase in the reservoir, namely a gas phase. During production, the bottom-hole pressure in the production well eventually falls to a value that is less than the dew point. As a result, heavy hydrocarbons (for example, heavy hydrocarbons have the molecular weight of greater than 30 g/mol) are condensed to a liquid phase. This liquid phase commonly accumulates in pore spaces in the area close to the wellbore, resulting in what is commonly known as "condensate banking". The condensate is trapped by capillary forces or is retained in the rock as a result of poor liquid mobility. This condensate blockage around the well bore can cause a reduction in the productivity of the well by a factor of two or more.

Several techniques have been developed in an attempt to alleviate condensate banking. One technique involves keeping the reservoir pressure greater than the dew point pressure by a recycling gas. However, recyclable gas volume is limited and this method cannot always keep the reservoir pressure high enough. Other approaches include drilling horizontal wells and hydraulic fracturing. These temporary solutions are costly as they require drilling rigs. There is, therefore, a need for improved methods and systems for mitigating condensate banking.

SUMMARY

The present application provides strategies for mitigating condensate banking in the vicinity of wellbores. Embodiments of the present application include methods and systems that are used to alter the wettability of a rock formation and thereby mitigate condensate banking. In some embodiments, the methods involve morphological modifications of the rock formation using particles (for example, nanoparticles) in combination with a chemical pre-treatment of the rock formation.

In one aspect, the present application provides methods for mitigating condensate banking in the vicinity of a wellbore for a gas condensate reservoir, which comprise contacting a rock formation in the vicinity of a wellbore for a gas condensate reservoir with a polymer solution. In some embodiments, the polymer solution comprises a charged polymer with a first net charge, forming a modified rock formation, and contacting the modified rock formation with a particle suspension. In some embodiments, the particle suspension comprises charged particles with a second net charge, wherein the first and second net charges are opposed.

In some embodiments, the charged polymer is positively charged in the polymer solution (cationic polymer) and the charged particles are negatively charged in the particle suspension (anionic particles). In some embodiments, the charged polymer comprises a plurality of amine groups. In some embodiments, the charged polymer comprises a plurality of quaternary ammonium groups. In some embodiments, the charged polymer is a quaternizable polymer prepared by polymerization of vinylimidazole with a vinyl or acrylic, or both monomers. In some embodiments, the charged polymer is a polyquaternium. In some embodiments, the charged polymer is a polyethylenimine (including functionalized derivatives of polyethylenimine). In some embodiments, the polymer solution has a pH in the range of about 5 to about 10, for example, in the range of about 7 to about 10. In some embodiments, the charged polymer has a number average molecular weight within a range of about 120 to about 800,000 grams per mole for example, within the range of about 300 to about 10,000 grams per mole. In some embodiments, the charged polymer is present in the polymer solution in an amount that ranges from about 0.01 volume percent to about 10 volume percent, for example, in the range of about 0.1 volume percent to about 5 volume percent.

In some embodiments, the charged particles comprise negatively charged particles, for example, negatively charged silica, zirconia, or titanium nanoparticles. In some embodiments, the charged particles are partially modified with fluorine-containing groups. In some embodiments, the charged particles have a mean diameter in the range of about 30 nanometer (nm) to about 1,000 nm, for example, in the range of about 30 nm to about 500 nm. In some embodiments, the charged particles are present in the particle suspension in an amount that ranges from about 0.01 weight percent to about 10 weight percent, for example, in the range of about 0.02 weight percent to about 1.0 weight percent.

In some embodiments, the polymer solution comprises a solvent selected from the group consisting of ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol), PROPYL CELLOSOLVE™ Solvent (Ethylene Glycol Mono-n-propyl Ether), METHYL CARBITOL™ Solvent (Diethylene Glycol Monoethyl Ether), DOWANOL™ DPM Glycol Ether (Dipropylene Glycol Methyl Ether), DOWANOL™ PnP Glycol Ether (Propylene Glycol n-Propyl Ether), and combinations thereof. In some embodiments, the particle suspension comprises a solvent selected from the group consisting of ethanol, isopropanol, ethylene glycol, butanol, 2-butoxyethanol, butyl carbitol, pentanol, hexanol, terpene alcohols, PROPYL CELLOSOLVE™ Solvent, METHYL CARBITOL™ Solvent, DOWANOL™ DPM Glycol Ether, DOWANOL™ PnP Glycol Ether, and combinations thereof. In some embodiments, the first and second particle suspensions comprise the same solvent or combination of solvents.

In some embodiments, the charged polymer comprises a plurality of positively charged amine groups, for example, polyethylenimine and the charged particles are negatively charged particles, for example, fluorinated silica particles.

In some embodiments, the rock formation is negatively charged before it is contacted with the polymer solution. In some embodiments, the rock formation is a sandstone formation.

In some embodiments, the methods further comprise contacting the modified rock formation with a surfactant solution comprising a surfactant. In some embodiments, the methods further comprise contacting the modified rock formation with a surfactant solution comprising a surfactant before contacting the rock formation with the particle suspension. In some embodiments, the methods further comprise contacting the modified rock formation with a surfactant solution comprising a surfactant while contacting the rock formation with the particle suspension. In some embodiments, the methods further comprise contacting the modified rock formation with a surfactant solution comprising a surfactant after contacting the rock formation with the particle suspension. In some embodiments, the surfactant is present in the surfactant solution in an amount that ranges from about 0.1 weight percent to about 10 weight percent. In some embodiments, the surfactant solution comprises a solvent selected from the group consisting of ethanol, isopropanol, ethylene glycol, butanol, 2-butoxyethanol, butyl carbitol, pentanol, hexanol, terpene alcohols, PROPYL CELLOSOLVE™ Solvent, METHYL CARBITOL™ Solvent, DOWANOL™ DPM Glycol Ether, DOWANOL™ PnP Glycol Ether, and combinations thereof.

In another aspect, the present application provides systems for mitigating condensate banking in the vicinity of a wellbore for a gas condensate reservoir, which comprises a first container or source of a polymer solution that comprises a charged polymer with a first net charge, and a second container or source of a particle suspension that comprises charged particles with a second net charge. In some embodiments, the first and second net charges are opposed, and conduits for introducing the polymer solution and the particle suspension into the same rock formation in the vicinity of a wellbore for a gas condensate reservoir.

In some embodiments, the system further comprises a third container or source of a surfactant solution comprising a surfactant and a conduit for introducing the surfactant solution into the rock formation in the vicinity of a wellbore for a gas condensate reservoir.

In another aspect, the present application provides chemically treated rock formations prepared using the methods described in the present application. In some embodiments, the chemically treated rock formation is omniphobic. In some embodiments, the chemically treated rock formation has greater droplet mobility of water and oil relative to a non-treated rock formation. In some embodiments, the chemically treated rock formation has greater gas relative permeability ($K_{rg}$) relative to a non-treated rock formation. In some embodiments, the chemically treated rock formation has an improvement in the gas relative permeability by a factor of up to about 5.0 relative to the non-treated rock formation. In some embodiments, the chemically treated rock formation has greater liquid condensate relative permeability ($K_{ro}$) relative to a non-treated rock formation. In some embodiments, the chemically treated rock formation has an improvement in the liquid condensate relative permeability by a factor of up to about 5.0 relative to the non-treated rock formation. In some embodiments, a contact angle of deionized water on a surface of the chemically treated rock formation is in a range of about 60 to about 160 degrees. In some embodiments, a contact angle of an aqueous 2 weight % potassium chloride (KCl) on a surface of the chemically treated rock formation is in a range of about 60 to about 160 degrees. In some embodiments, a contact angle of decane on a surface of the chemically treated rock formation is in a range of about 40 to about 160 degrees.

Definitions

In order for the present application to be more readily understood, certain terms used in the present application are defined as follows. Additional definitions for the following terms and other terms may be set forth throughout the specification.

As used in this application, the term "comprise" and variations of the term, such as "comprising" and "comprises," are not intended to exclude other additives, components, integers or steps. In this application, where ranges are provided, endpoints are included. In this application, the term "a" may be understood to mean "at least one," unless otherwise clear from context.

Associated: In some embodiments, two or more entities are physically "associated" with one another if they interact, directly or indirectly, so that they are and/or remain in physical proximity with one another. In some embodiments, two or more entities that are physically associated with one another are covalently linked to one another; in some embodiments, two or more entities that are physically associated with one another are not covalently linked to one another but are non-covalently associated, for example by means of hydrogen bonds, van der Waals interaction, hydrophobic interactions, electrostatic interactions, and combinations thereof.

In the vicinity of a wellbore: As used in this application, the term "in the vicinity of a wellbore" refers to an area of a rock formation in or around a wellbore. In some embodiments, "in the vicinity of a wellbore" refers to an area where condensate banking may be occurring or have the potential to occur. In some embodiments, "in the vicinity of a wellbore" refers to a distance that is less than about 35 meters (m) from a wellbore (for example, less than about 30, less than about 25, less than about 20, less than about 15, less than about 10 or less than about 5 meters from a wellbore).

Nanoparticles: As used in this application, the term "nanoparticles" refers to particles that have a mean cross-section, for example, a mean diameter, of up to about 1,000 nm. In some embodiments the mean cross-section is measured by dynamic light scattering (DLS), for example, based on the scattering intensity distribution measured by photon correlation spectroscopy. In some embodiments, nanoparticles have a mean diameter of less than 300 nm, for example, a mean diameter of less than about 100 nm.

Omniphobic: As used in this application, the term "omniphobic" refers to a surface that is non-wetting to aqueous as well as oleic or hydrocarbon phases. In some embodiments, an omniphobic surface repels one or more liquid phases, thereby improving gas relative permeability or liquid relative permeability, or both gas and liquid relative permeability.

Substantially: As used herein, the term "substantially" refers to the qualitative condition of exhibiting total or near-total extent or degree of a characteristic or property of interest.

BRIEF DESCRIPTION OF THE DRAWINGS

FIG. 2 depicts contact angle measurements of decane on sandstone surfaces treated with a method of the present application. The surfaces were treated with 135 nm nanoparticles or 180 nm nanoparticles.

DETAILED DESCRIPTION

Figure 1:
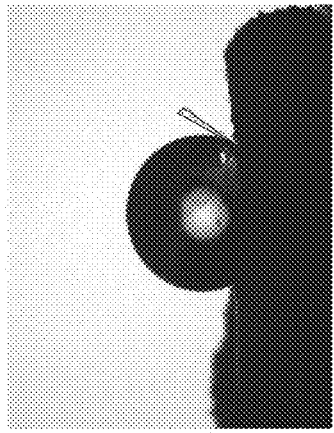
FIG. 1 depicts contact angle measurements of water and decane on a glass surface and a sandstone surface that have been treated with a method of the present application. The surfaces were treated with the functionalized polyethylenimine (fPEI) and 85 nm nanoparticles.

Throughout the description, where methods are described as having, including, or comprising specific steps, or where systems are described as having, including, or comprising specific components, it is contemplated that, additionally, there are methods according to the present application that consist essentially of, or consist of, the recited processing steps, and that there are systems of the present application that consist essentially of, or consist of, the recited components.

It should be understood that the order of steps or order for performing certain actions is immaterial so long as the method or system remains operable. Moreover, two or more steps or actions may be conducted simultaneously.

The mention of any publication in the present application, for example, in the Background section, is not an admission that the publication serves as prior art with respect to any of the claims. The Background section is presented solely for purposes of clarity and is not meant as a description of prior art with respect to any claim.

The present application encompasses the insight that certain chemical treatments of a rock formation in the vicinity of a wellbore may be used to enhance gas and condensate productivities from a reservoir by reducing pressure drop during gas production. Furthermore, in some embodiments, the present application provides insights that permit improved chemical treatments of certain rock formations (for example, sandstone formations) that have unique physicochemical properties. In some embodiments, chemical treatments provided in the present application alter the wettability of a rock formation. For example, in certain embodiments, chemical treatments of the present application reduce the wettability of the rock formation to water or oil. In some embodiments, the wettability of a rock formation to water or oil is reduced by providing surface roughness to the rock formation. Alternatively or additionally, wettability of the rock formation to water or oil may be reduced by reducing the surface free energy of the rock formation.

In some embodiments, a rock formation subjected to a chemical treatment in accordance with the methods of the present application possesses a net charge (for example, a negative charge). In some embodiments, the rock formation is a sandstone formation. In some embodiments, the sandstone formation comprises quartz, feldspar or clay.

Methods for Modifying a Rock Formation

In certain embodiments, methods provided by the present application use a polymer solution to modify a rock formation in the vicinity of a wellbore for a gas condensate reservoir. In some embodiments, the polymer solution comprises a charged polymer, for example, a positively charged polymer (cationic polymer).

In some embodiments, the charged polymer comprises a plurality of amine groups. In some embodiments, the charged polymer comprises a plurality of quaternary ammonium groups. In some embodiments, the charged polymer is a quaternizable polymer prepared by polymerization of vinylimidazole with a vinyl or acrylic, or both monomers. In some embodiments, the charged polymer is a polyquaternium. In some embodiments, the charged polymer is a polyethylenimine (including functionalized derivatives of polyethylenimine). In some embodiments, the charged polymer (for example, a functionalized derivative of polyethylenimine) comprises a functional group that can form a covalent bond with a rock formation.

In some embodiments, a polymer solution comprises a solvent selected from the group consisting of ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol), PROPYL CELLO-SOLVE™ Solvent (Ethylene Glycol Mono-n-propyl Ether), METHYL CARBITOL™ Solvent (Diethylene Glycol Monoethyl Ether), DOWANOL™ DPM Glycol Ether (Dipropylene Glycol Methyl Ether), DOWANOL™ PnP Glycol Ether (Propylene Glycol n-Propyl Ether), and combinations thereof.

In some embodiments, a charged polymer is present in the polymer solution in an amount that ranges from about 0.01 to about 10 volume percent. In some embodiments, a charged polymer is present in the polymer solution in an amount that ranges from about 0.1 to about 10 volume percent. In some embodiments, a charged polymer is present in the polymer solution in an amount that ranges from about 1 to about 10 volume percent. In some embodiments, a charged polymer is present in the polymer solution in an amount that ranges from about 0.01 to about 5 volume percent. In some embodiments, a charged polymer is present in the polymer solution in an amount that ranges from about 0.1 to about 5 volume percent. In some embodiments, a charged polymer is present in the polymer solution in an amount that ranges from about 1 to about 5 volume percent. Without wishing to be bound by any particular theory, the particular concentration used may depend on the permeability of a rock formation.

In some embodiments, a polymer solution has a pH within a range of about 5 to about 10. In some embodiments, a polymer solution has a pH within a range of about 7 to about 10, for example, within a range of about 8 to about 10 or about 8 to about 9.5. In some embodiments, a pH-adjusting agent (for example, HCl) is added to a polymer solution to adjust the pH of the polymer solution.

In some embodiments, a charged polymer has a number average molecular weight within a range of about 120 to about 800,000 grams per mole for example, within the range of about 300 to about 10,000 grams per mole.

Methods for Texturing a Modified Rock Formation

In certain embodiments, methods provided by the present application use particles, for example, nanoparticles to provide roughness or low surface energy to a modified rock formation. In some embodiments, nanoparticles may associate with a modified rock formation. In some embodiments, nanoparticles are charged in a particle suspension that is contacted with the modified rock formation. For example, nanoparticles are positively charged in the particle suspension.

In some embodiments, nanoparticles comprise a net charge in certain solvent(s) or solution(s). In some embodiments, a net charge of nanoparticles is negative. In some embodiments, a net charge of nanoparticles is opposite to a net charge of a polymer.

In some embodiments, nanoparticles are, or comprise, a material selected from the group consisting of a metal, a semi-metal (a material with a very small overlap between the bottom of the conduction band and the top of the valence band), a non-metal, oxides, borides, carbides, sulfides and nitrides of the metal, semi-metal or non-metal, and combinations thereof. In some embodiments, nanoparticles are or comprise a metal oxide. In some embodiments, the nanoparticles are or comprise silica, titania, zirconia, germania, alumina, tantalum pentoxide, zinc oxide, or combinations thereof. In some embodiments, nanoparticles are or comprise silica. In some embodiments, nanoparticles are or comprise polymer. For example, in some embodiments, nanoparticles are or comprise polystyrene or methacrylate-based polymers.

In some embodiments, surfaces of nanoparticles are fluorinated. In some embodiments, nanoparticles are fluorinated silica nanoparticles. In some embodiments, nanoparticles are or comprise fluorinated polymeric materials, for example, fluorinated polystyrene or methacrylate-based polymers.

In some embodiments, nanoparticles have a mean diameter in a range of about 30 nm to about 500 nm. In some embodiments, nanoparticles have a mean diameter in a range of about 100 nm to about 500 nm. In some embodiments, nanoparticles have a mean diameter in a range of about 100 nm to about 400 nm.

In some embodiments, a nanoparticle suspension is contacted with a modified rock formation. In some embodiments, nanoparticles are present in a suspension in an amount that ranges from about 0.01 to about 10 weight percent. In some embodiments, nanoparticles are present in a suspension in an amount that ranges from about 0.01 to about 5 weight percent. In some embodiments, nanoparticles are present in a suspension in an amount that ranges from about 0.01 to about 1 weight percent. In some embodiments, nanoparticles are present in a suspension in an amount that ranges from about 0.01 to about 0.5 weight percent. In some embodiments, nanoparticles are present in a suspension in an amount that ranges from about 0.05 to about 0.5 weight percent.

In some embodiments, a nanoparticle suspension comprises a solvent selected from the group consisting of ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol), PROPYL CELLOSOLVE™ Solvent (Ethylene Glycol Mono-n-propyl Ether), METHYL CARBITOL™ Solvent (Diethylene Glycol Monoethyl Ether), DOWANOL™ DPM Glycol Ether (Dipropylene Glycol Methyl Ether), DOWANOL™ PnP Glycol Ether (Propylene Glycol n-Propyl Ether), and combinations thereof.

In some embodiments, methods provided by the present application comprise contacting a surfactant solution comprising a surfactant with a rock formation. In some embodiments, the solution comprising the surfactant may be applied before associating nanoparticles with the modified rock formation. In some embodiments, the solution comprising the surfactant may be applied after associating nanoparticles with the modified rock formation. In some embodiments, the nanoparticle suspension and the surfactant solution may be applied to the rock formation simultaneously. In some embodiments, the surfactants are included in the nanoparticle suspension when applied to the rock formation.

In some embodiments, the surfactant alters the surface of the rock formation. In some embodiments, the surfactant enhances the adhesion of the polymer, nanoparticle, or both to the surface of the rock formation. In some embodiments, the surfactant stabilizes the polymer, nanoparticle, or both on the surface of the rock formation.

In some embodiments, the surfactant associates with the rock formation. For example, the surfactant may interact with a hydroxyl group on the surface of the rock formation. In some embodiments, the surfactant may associate with the hydroxyl group. Additionally or alternatively, the surfactant may provide additional omniphobicity along with the nanoparticles. In some embodiments, the surfactant associates with the charged polymers applied for the modification of the rock surface. In some embodiments, the surfactant provides additional positive charges for associating the nanoparticles. In some embodiments, the surfactant assists the association of the polymer with the rock formation.

In some embodiments, the surfactant may be cationic, nonionic, or amphoteric. In some embodiments, the surfactant comprises fluorinated surfactant, polymeric surfactant, fluorinated polymeric surfactants or combinations thereof. In some embodiments, the surfactant is selected from the group consisting of octenidine dihydrochloride, cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), alkylphenol ethoxylates, aliphatic alcohol ethoxylates, aliphatic alkylamine ethoxylates, sorbitan esters and their ethoxylates, castor oil ethoxylates, ethylene oxide/propylene oxide copolymers, perfluorooctanoic acid (PFOA), perfluorooctane sulfonate (PFOS), perfluorohexane sulfonic acid (PFHxS), perfluorononanoic acid (PFNA), perfluorodecanoic acid (PFDA), cocamidopropyl betaine, cocoamidopropyl sultaine, amidosulfobetaine, auroamphoglycinate, dihydroxyethyl tallow glycinate, isostearoamphopropionate, auryl-N,N-(dimethylammonio)butyrate, lauryl-N,N-(dimethyl)-glycinebetaine, 3-[(3-cholamidopropyl)dimethylammonio]-1-propanesulfonate, 3-([3-cholamidopropyl]dimethylammonio)-2-hydroxy-1-propanesulfonate, auryl-N,N-(dimethyl)-propanesulfonate, 3-(4-tert-butyl-1-pyridinio)-1-propanesulfonate, 3-(1-pyridinio)-1-propanesulfonate, 3-(benzyl-dimethylammonio) propanesulfonate, and combinations thereof.

In some embodiments, surfactants are present in a solution in an amount that ranges from about 0.1 to about 10 weight percent. In some embodiments, surfactants are present in a solution in an amount that ranges from about 0.5 to about 10 weight percent. In some embodiments, surfactants are present in a solution in an amount that ranges from about 1 to about 10 weight percent. In some embodiments, surfactants are present in a solution in an amount that ranges from about 5 to about 10 weight percent. In some embodiments, surfactants are present in a solution in an amount that ranges from about 0.1 to about 5 weight percent. In some embodiments, surfactants are present in a solution in an amount that ranges from about 0.1 to about 3 weight percent. In some embodiments, surfactants are present in a solution in an amount that ranges from about 0.1 to about 1 weight percent.

In some embodiments, a surfactant solution comprises a solvent selected from the group consisting of ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol), PROPYL CELLOSOLVE™ Solvent (Ethylene Glycol Mono-n-propyl Ether), METHYL CARBITOL™ Solvent (Diethylene Glycol Monoethyl Ether), DOWANOL™ DPM Glycol Ether (Dipropylene Glycol Methyl Ether), DOWANOL™ PnP Glycol Ether (Propylene Glycol n-Propyl Ether), and combinations thereof.

Properties of Chemically Treated Rock Formation

In some embodiments, a rock formation that has been modified with a polymer solution and textured with a particle suspension (a "chemically treated rock formation") is characterized by certain properties.

In some embodiments, a chemically treated rock formation is omniphobic. In some embodiments, a chemically treated rock formation has greater droplet mobility (both water droplet and oil droplet, for example, a droplet of water and a droplet of decane) relative to a non-treated rock formation. In some embodiments, a surface of a chemically treated rock formation may prefer gas to water or oil energetically, thereby reducing pressure drop, entrapment, or accumulation of liquid phase within the pore space.

In some embodiments, a liquid condensate relative permeability ($K_{ro}$), a gas relative permeability ($K_{rg}$), or both are useful to determine the effectiveness of the treatment. A relative permeability ($K_r$) is the ratio of effective permeability ($K_e$) of a particular fluid in a multiphase flow to absolute permeability ($K_a$). The absolute permeability is a property of a porous medium, and represents the capacity of the medium to transmit fluids by measuring the permeability of the medium saturated with a single phase fluid.

In some embodiments, the single phase fluid may be any fluid having one phase (for example, gas or liquid). In some embodiments, the single phase fluid may be nitrogen, water, hydrocarbon, or aqueous 2 weight percent KCl solution. In some embodiments, the absolute permeability may be calculated from Darcy's equation, as follows:

$$K_a = \frac{Q_s \mu_s L}{A \Delta P} \quad (1)$$

where $Q_s$ is the flow rate of the single phase fluid (cubic centimeter per minute (cm$^3$/min)), $\mu_s$ is the viscosity of the single phase fluid (centipoise (cP)), L is the length of the core sample (cm), A is the cross section of the core sample (square centimeter (cm$^2$)), and $\Delta P$ is the pressure drop across the core sample (atmosphere).

In some embodiments, under steady state conditions, the effective permeability of a liquid condensate ($K_{eo}$) and the effective permeability of a gas ($K_{eg}$) in a core sample may be calculated from Darcy's equation, as follows:

$$K_{eo} = \frac{Q_o \mu_o L}{A \Delta P} \quad (2)$$

$$K_{eg} = \frac{Q_g \mu_g L}{A \Delta P} \quad (3)$$

where $Q_o$ is the flow rate of the liquid condensate (cm$^3$/min), $Q_g$ is the flow rate of the gas (cm$^3$/min), $\mu_o$ is the viscosity of the liquid condensate (cP), and $\mu_g$ is the viscosity of the gas (cP). In some embodiments, the ratio of the relative permeability of liquid condensate (or gas) after and before the chemical treatment is used to calculate the relative permeability improvement factor and to determine the success of the treatment.

In some embodiments, the relative permeability of liquid condensate and gas may be measured by the procedure as described in Example 3.

In some embodiments, a mixture of hydrocarbons may be used for the measurement of the relative permeability of liquid condensate and gas. In some embodiments, the mixture comprises one or more saturated hydrocarbons. In some embodiments, the carbon number of the saturated hydrocarbons ranges from 1 to 40. In some embodiments, the mixture comprises methane, ethane, propane, butane(s), hexane(s), heptane(s), octane(s), nonane(s), decane(s), undecane(s) and dodecane(s). For example, Table 4 in Example 3 shows exemplary compositions of the hydrocarbon mixtures for the measurement of the relative permeability of liquid condensate and gas. In some embodiments, a chemically treated rock formation has greater gas relative permeability ($K_{rg}$) relative to a non-treated rock formation. In some embodiments, a chemically treated rock formation has an improvement in gas relative permeability by a factor of up to about 5.0, up to about 4.5, up to about 4.0, up to about 3.5, up to about 3.0, up to about 2.5, up to about 2.0, up to about 1.9, up to about 1.8, up to about 1.7, up to about 1.6, up to about 1.5, up to about 1.4, up to about 1.3, up to about 1.2, or up to about 1.1 relative to a non-treated rock formation.

In some embodiments, a chemically treated rock formation has greater liquid condensate relative permeability ($K_{ro}$) relative to a non-treated rock formation. In some embodiments, a chemically treated rock formation has an improvement in liquid condensate relative permeability by a factor of up to about 5.0, up to about 4.5, up to about 4.0, up to about 3.5, up to about 3.0, up to about 2.5, up to about 2.0, up to about 1.9, up to about 1.8, up to about 1.7, up to about 1.6, up to about 1.5, up to about 1.4, up to about 1.3, up to about 1.2, or up to about 1.1 relative to a non-treated rock formation.

In some embodiments, the contact angle of deionized water on a surface of a chemically treated rock formation is in a range of about 60 to about 160 degrees, about 90 to about 160 degrees, or about 120 to about 160 degrees.

In some embodiments, the contact angle of an aqueous 2 weight % potassium chloride (KCl) solution on a surface of a chemically treated rock formation is in a range of about 60 to about 160 degrees, about 90 to about 160 degrees, or about 120 to about 160 degrees.

In some embodiments, the contact angle of decane on a surface of a chemically treated rock formation is in a range of about 40 to about 160 degrees, about 45 to about 160 degrees, or about 50 to about 160 degrees.

In some embodiments, a chemically treated rock formation exhibits hierarchical roughness. In some embodiments, a chemically treated rock formation has a first characteristic length (for example, an inherent surface roughness or pore size of a rock formation, for example, on a micron scale), and a second characteristic length (for example, a mean diameter of nanoparticles, for example, on a nanometer scale), wherein the first characteristic length and the second characteristic length are substantially different, creating hierarchical roughness.

Systems for Chemical Treatment of a Rock Formation

In some embodiments, a system for mitigating condensate banking in the vicinity of a wellbore for a gas condensate reservoir comprises a first container or source of a polymer solution (for example, comprising a charged polymer with a first net charge), a second container or source of a particle suspension (for example, comprising charged particles with a second net charge) and conduits for introducing the polymer solution and the particle suspension into the same rock formation in the vicinity of a wellbore for a gas condensate reservoir In some embodiments, a system for mitigating condensate banking in the vicinity of a wellbore introduces a polymer solution into the rock formation. In some embodiments, the flow rate is adjusted to provide enough time for polymers in the polymer solution to associate with the rock formation to form a modified rock formation.

In some embodiments, a system for mitigating condensate banking in the vicinity of a wellbore introduces a particle suspension into the rock formation. In some embodiments, the flow rate is adjusted to provide enough time for particles in the particle suspension (for example, nanoparticles) to associate with a modified rock formation to create a chemically treated rock formation.

In some embodiments, a system introduces a polymer solution and a particle suspension into a rock formation in the vicinity of a wellbore by introducing them into the wellbore, or by injecting them into areas around the wellbore. In some embodiments, a polymer solution and a particle suspension may flow through a wellbore to a rock formation, for example, through pore spaces in the rock formation itself due to a pressure difference between the wellbore and the rock formation. In some embodiments, a polymer solution and a particle suspension may be injected through a wellbore, and then the polymer solution and the particle suspension may be transported to an area around the wellbore.

In some embodiments, a polymer solution and a particle suspension may be injected via a coiled tubing or bullheading in a production tubing string. In some embodiments, a polymer solution and a particle suspension may be injected in separate stages and use the same or different conduits.

EXAMPLES

In order that the application may be more fully understood, the following examples are set forth. It should be understood that these examples are for illustrative purposes only and are not to be construed as limiting in any manner.

Example 1

Surface Modification of Sandstone

The present Example describes the modification of a sandstone surface in accordance with certain embodiments of the present application. The exemplary process is to be presented.

Synthesis of Fluorinated Silica Nanoparticles (F-Silica Nanoparticles)

The Stöber process was adopted for preparation of silica nanoparticles. Silica nanoparticles were synthesized in alcoholic solvents with ammonium hydroxide as a catalyst. Four batches of silica nanoparticles were synthesized, which had 85 nm, 135 nm, 180 nm and 375 nm mean diameters. 100 microliter (μL) of 1H,1H,2H,2H-Perfluorooctyltriethoxysilane, 97% was added into 20 milliliter (mL) of the crude nanoparticle suspensions for surface modification. Crude silica nanoparticles were in the concentration ranges of about 5 milligram per milliliter (mg/mL) to about 13 mg/mL depending on the size of the nanoparticles. Surface fluorination reactions were carried out at room temperature for 8 hours.

The F-silica nanoparticles were washed twice by centrifugation at 9000 revolutions per minute (RPM) for 20 minutes and re-suspended in ethanol, forming a F-silica nanoparticle suspension.

Surface Modification of Sandstone

Sandstone fragments were obtained by fracturing from a large piece. The stones were rinsed once in deionized water to remove any debris before being placed in a 100 mL beaker containing 50 mL of ethanol. 500 μL of Trimethoxysilylpropyl modified polyethylenimine, 50%, in isopropanol was added into the solution. This surface modification procedure proceeded overnight at room temperature without agitation. The solution was decanted off the next day and the stone fragments were washed in ethanol and water sequentially and allowed to dry. Since the sandstone surface typically has negative charges and fPEI has positive charges on its surface, the adsorption of fPEI onto the sandstone surface is likely due to the covalent force.

Nano-Texturing Surface Modification

To obtain a hierarchically roughened sandstone surface, stone fragments that had been modified with the functionalized polyethylenimine (fPEI) were contacted with the F-silica nanoparticle suspension (about 1.3 weight percent) in two ways. The first method involved directly applying droplets of the F-silica nanoparticle suspension onto the dried surface and allowing the suspension to imbibe into the stone fragments. The second method involved soaking the stone fragments in the F-silica nanoparticle suspension for 10 minutes, removing the stone fragments from the suspension, followed by washing (with ethanol, followed by water, once each) and drying. As the F-silica nanoparticles have negative charges, they interact with the fPEI modified sandstone surface.

Example 2

Characterization

The present Example describes experiments that were performed to characterize surface modified sandstone and silica nanoparticles in accordance with certain embodiments of the present application.

Contact Angle Measurement

Contact angles were measured at room temperature and pressure by using a Ramé-hart precision contact angle goniometer.

A droplet of liquid (water or decane) was placed on glass and sandstone surfaces, each of which was treated with fPEI and F-silica nanoparticle suspension. The contact angle was measured from the liquid phase tracing its contour. As shown in FIG. 1, the as-fractured sandstone surface was not subjected to any filing or polishing prior to treatment with fPEI and F-silica nanoparticles. To minimize error in the contact angle measurement, the treated sandstone was placed on a sand bed such that planarity could be optimized. In FIG. 1, the F-silica nanoparticles having 85 nm mean diameter were utilized. For the data reported in FIG. 2, the fractured sandstone surfaces were filed to generate a planar surface before placing the decane droplets on the treated surface.

Silica Particle Size Distribution

Figure 3:
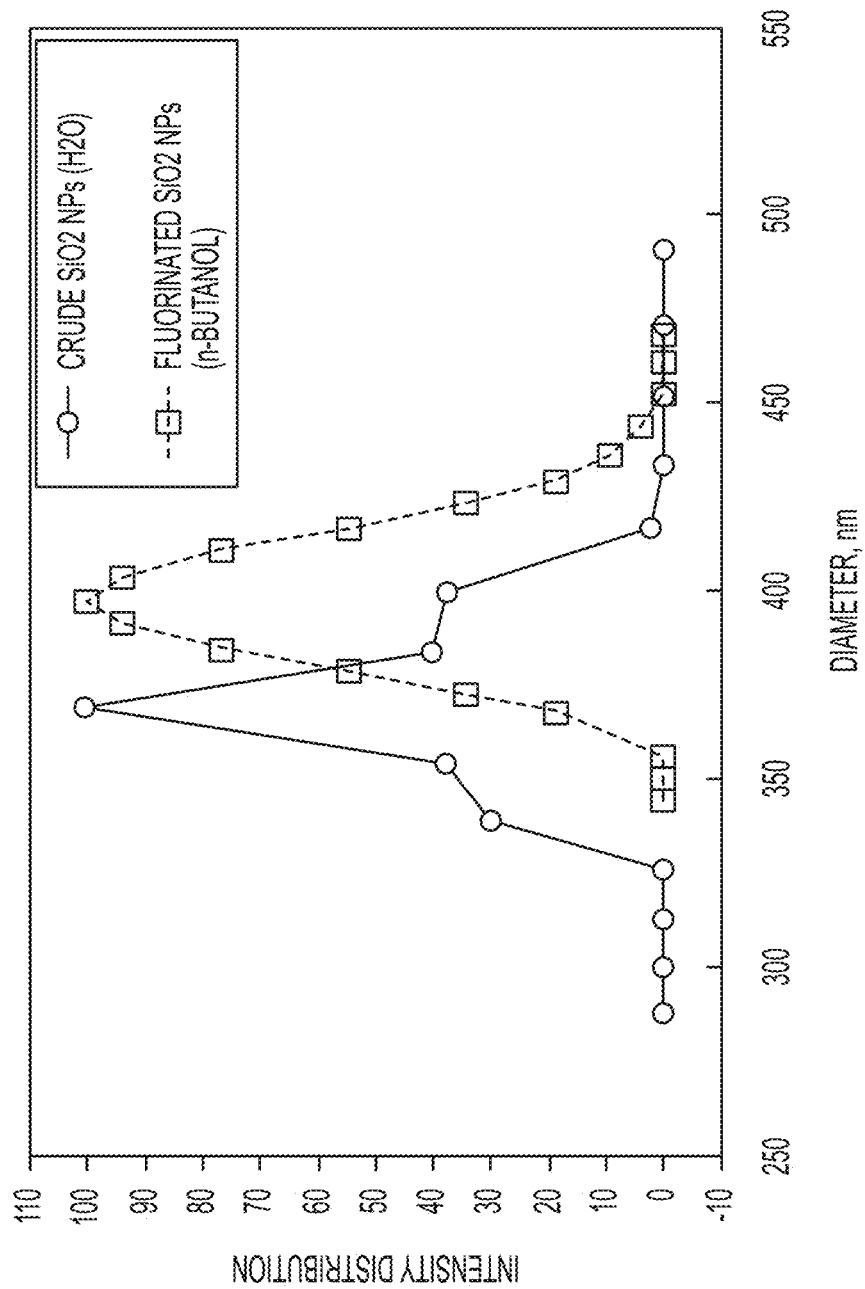
FIG. 3 is a graph showing particle size distributions of unfluorinated ("crude") and fluorinated nanoparticles.

A sample of 375 nm silica nanoparticles was prepared using Stöber silica synthesis in isopropyl alcohol (IPA). The sample was then exchanged into n-butanol via rotary evaporator, and the size of the nanoparticles was characterized by dynamic light scattering (DLS). The DLS measurements were taken by diluting the crude nanoparticles in deionized water at 1:100 dilution factor, and similarly diluting the F-silica nanoparticles into n-butanol at 1:100 dilution factor. In one example, the crude nanoparticles had a mean diameter (derived from the scattering intensity distribution measured by photon correlation spectroscopy) of 382.50 nm, standard error of 1.99 nm, and standard deviation of 3.45 nm (see Table 1 and FIG. 3). The fluorinated nanoparticles had a mean diameter of 402.06 nm, standard error of 2.8 nm, and standard deviation of 4.85 nm (see Table 2 and FIG. 3).

TABLE 1

Particle size distribution of un-fluorinated ("crude") nanoparticles

| Sample # | Mean diameter (nm) | Polydispersity |
|---|---|---|
| 1 | 385.74 | 0.04 |
| 2 | 378.87 | 0.05 |
| 3 | 382.88 | 0.07 |

TABLE 2

Particle size distribution of fluorinated nanoparticles

| Sample # | Mean diameter (nm) | Polydispersity |
|---|---|---|
| 1 | 405.87 | 0.008 |
| 2 | 403.71 | 0.021 |
| 3 | 396.60 | 0.115 |

Example 3

Coreflood Experiment

The present Example provides results demonstrating a pressure drop reduction across a core sandstone sample after a treatment in accordance with the present application.

The cylindrical core sandstone sample used in this example was obtained from a wellbore for a gas condensate reservoir in Texas by drilling the rock formation. The diameter of the core sandstone sample was 1.5 inches, and the length of the core sandstone sample was 6 inches. Prior to the measurement, the sample was dried in an oven at temperature of 150° C. (302° F.) for two days until the sample was completely dried. The sample was weighed using a digital balance to obtain the dry weight of the sample. The dried sample was saturated with an aqueous 2 weight percent KCl solution under vacuum for 24 hours.

The process that was used to measure the pressure drop reduction before and after the treatment was as follows:

1. The aqueous 2 weight percent KCl solution was injected into the sandstone core sample at different flow rates (Q). For each flow rate, the pressure drop (ΔP) after stabilization was recorded as shown in Table 3. The pressure drops across the core sample and other parameters such as flow rate, viscosity, cross sectional area and length of the core sandstone sample, were applied to Darcy's equation to calculate the absolute permeability of the sample. Q/A and ΔP/L were calculated, and Q/A vs ΔP/L was plotted. The slope of the graph ($K_a/\mu_s$) was 0.0145. As $\mu_s$ was 0.893 cP, $K_a$ was 13.0.

TABLE 3

ΔP measurement varying Q, and Q/A and ΔP/L calculation for $K_a$

| Rate of injection (Q, cm³/sec) | Pressure drop (ΔP, atmosphere) | Q/A | ΔP/L |
|---|---|---|---|
| 0.0167 | 1.43 | 0.00146 | 0.0937 |
| 0.0333 | 2.99 | 0.00292 | 0.196 |
| 0.0667 | 6.12 | 0.00585 | 0.402 |
| 0.133 | 12.3 | 0.0117 | 0.808 |

2. The core sample was placed under nitrogen injection overnight to displace water and create interstitial water saturation and mimic gas condensate reservoir conditions. The conditions can be similar to the experimental conditions which is typically the reservoir downhole conditions of pressure and temperature (for example, the temperature is about 300° F., the pressure is about 3000 psi to 6000 psi).
3. A hydrocarbon gas mixture stream (at 5 mL per minute) was then injected into the core sample, to obtain a pressure drop curve before the treatment. The composition of the hydrocarbon gas mixture used in this Example is summarized in Table 4. The composition of the gas mixture allows condensation of hydrocarbon liquid inside the core sample and mimics two-phase flow of gas and liquid condensate in the porous medium.

TABLE 4

Compositions of hydrocarbon gas mixture

| Component | Gas mixture #1 (Mol %) | Gas mixture #2 (Mol %) |
|---|---|---|
| Methane | 83 | 76.7 |
| Ethane | 0 | 4.53 |
| Propane | 4 | 2.5 |
| iso-Butane | 0 | 0.71 |
| n-Butane | 0 | 1.2 |
| iso-Pentane | 0 | 0.49 |
| n-Pentane | 0 | 0.52 |
| Hexanes | 0 | 1.07 |
| Heptanes | 7.2 | 1.7 |
| Octanes | 0 | 1.73 |
| Nonanes | 0 | 1.76 |
| Decanes | 4 | 1.95 |
| Undecanes | 0 | 0.94 |
| Dodecanes | 1.8 | 4.2 |

4. 100 mL (or 3 pore volumes where the "pore volume" is the total volume of the pore spaces within one core sample) of trimethoxysilylpropyl modified polyethylenimine solution (2 volume percent in butanol at 2 mL per minute) was then injected into the core sample. The core sample was left overnight after 100 mL injection was complete. The excess volume was allowed to flow out of the "bottom" of the core sample.
5. 100 mL (or 3 pore volumes) of an F-silica nanoparticle suspension prepared in accordance with the methods in Example 1 (0.065 weight percent in butanol at 1 mL per minute) was injected into the core sample modified with the functionalized PEI. The F-silica nanoparticles in the suspension had the mean diameter of 375 nm. The surface modification procedure proceeded overnight.
6. The same hydrocarbon gas mixture stream as used in step 3 (at 5 mL per minute) was injected into the core sample to obtain a pressure drop curve and the relative permeability of gas and liquid condensate after the treatment.

7. The pressure drop curves before and after the treatment were compared.

Figure 4:
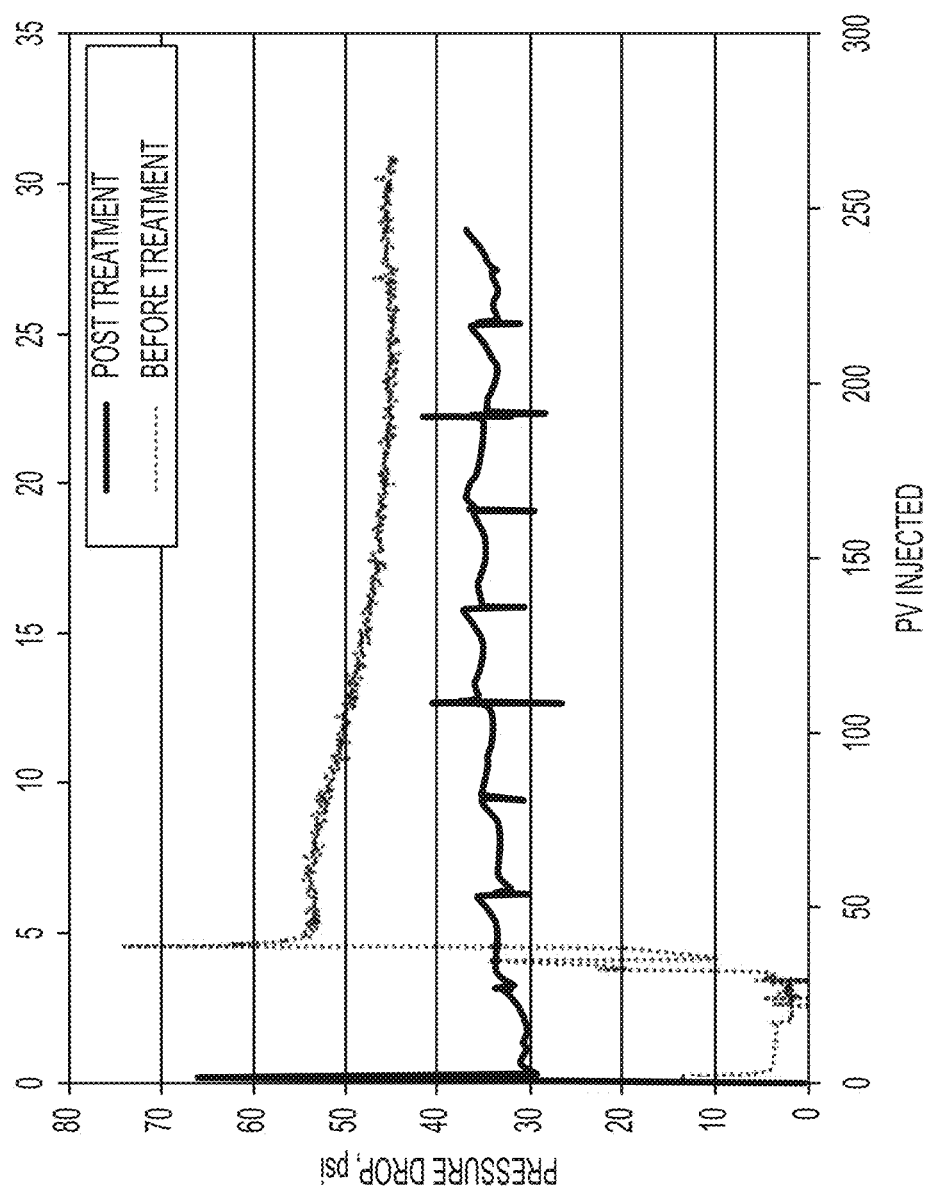
FIG. 4 is a graph depicting a pressure drop during gas injection before and after a chemical treatment provided by the present application.

The pressure drop curves are shown in FIG. 4. The pressure drop during gas injection prior to the treatment averaged about 48 pound-force per square inch (psi). The pressure drop during gas injection after the treatment averaged about 34.4 psi (a 28.3 percent reduction as compared to the pressure drop before the treatment).

The treatment was also able to achieve an improvement in the gas relative permeability by a factor of 1.4, and the liquid condensate relative permeability by a factor of 1.4. As described in Section Properties of Chemically Treated Rock Formation, the relative permeability is the ratio of effective permeability of the gas or the liquid condensate in the hydrocarbon mixture to the absolute permeability. The effective permeability was calculated from Darcy's equation similarly to the absolute permeability as discuss in Step 1.

Example 4

Effect of pH

The present Example shows the effect of adjusting the pH of the functionalized PEI solution in certain embodiments of the present application.

The pH of fPEI solutions were adjusted with 1.0 M HCl. 0 to 100 μL of 1.0 M HCl solution was added to 10 mL fPEI solution in butanol, and pH values in the range of about 7 to about 9 were then recorded. The turbidity of the resulting solutions was then observed immediately after and six hours after addition of F-silica particles. In some embodiments, increased turbidity was observed at lower pH which may be due to increased interactions between fPEI and the F-silica nanoparticles. Without limitation, the F-silica nanoparticles may adhere more strongly to fPEI, when the pH is decreased, because of the increased surface charge. Indeed, at non-basic pH, fPEI is highly positively charged, and silica particles are highly negatively charged.

OTHER EMBODIMENTS

Certain embodiments of the present application were described previously. It is, however, expressly noted that the present application is not limited to those embodiments, but rather the intention is that additions and modifications to what was expressly described in the present application are also included within the scope of the application. Moreover, it is to be understood that the features of the various embodiments described in the present application were not mutually exclusive and can exist in various combinations and permutations, even if such combinations or permutations were not made express, without departing from the spirit and scope of the application. Having described certain implementations of methods of mitigating condensate banking, it will now become apparent to one of skill in the art that other implementations incorporating the concepts of the application may be used. Therefore, the application should not be limited to certain implementations, but rather should be limited only by the spirit and scope of the following claims.

We claim:

1. A method for mitigating condensate banking in the vicinity of a wellbore for a gas condensate reservoir, the method comprising:
    contacting a sandstone formation in the vicinity of a wellbore for a gas condensate reservoir with a polymer solution, wherein the polymer solution comprises a charged polymer with a first net charge, thereby forming a modified sandstone formation; and
    contacting the modified sandstone formation with a particle suspension, wherein the particle suspension comprises charged particles with a second net charge, wherein the first and second net charges are opposed.

2. The method of claim 1, wherein the charged polymer is positively charged in the polymer solution and the charged particles are negatively charged in the particle suspension.

3. The method of claim 2, wherein the charged polymer comprises a plurality of amine groups.

4. The method of claim 2, wherein the charged polymer comprises a plurality of quaternary ammonium groups.

5. The method of claim 2, wherein the charged polymer is a quaternizable polymer prepared by polymerization of vinylimidazole with a vinyl or acrylic, or both monomer.

6. The method of claim 2, wherein the charged polymer is a polyquaternium.

7. The method of claim 2, wherein the charged polymer is a polyethylenimine.

8. The method of claim 7, wherein the charged polymer is a functionalized derivative of polyethylenimine.

9. The method of claim 1, wherein the polymer solution has a pH in the range of about 5 to about 10.

10. The method of claim 1, wherein the charged polymer has a number average molecular weight in the range of about 120 to about 800,000 grams per mole.

11. The method of claim 1, wherein the charged polymer is present in the polymer solution in an amount that ranges from about 0.01 volume percent to about 10 volume percent.

12. The method of claim 1, wherein the charged particles comprise silica, zirconia, or titanium nanoparticles.

13. The method of claim 1, wherein the charged particles comprise polystyrene or methacrylate-based polymers.

14. The method of claim 1, wherein the charged particles are fluorinated.

15. The method of claim 1, wherein the charged particles have a mean diameter in the range of about 30 nm to about 500 nm.

16. The method of claim 1, wherein the charged particles are present in the particle suspension in an amount that ranges from about 0.01 weight percent to about 10 weight percent.

17. The method of claim 1, wherein the polymer solution comprises a solvent selected from the group consisting of ethanol, isopropanol, ethylene glycol, butanol, 2-butoxyethanol, butyl carbitol, pentanol, hexanol, terpene alcohols, ethylene glycol mono-n-propyl ether, diethylene glycol monoethyl ether, dipropylene glycol methyl ether, propylene glycol n-propyl ether, and combinations thereof.

18. The method of claim 1, wherein the particle suspension comprises a solvent selected from the group consisting of ethanol, isopropanol, ethylene glycol, butanol, 2-butoxyethanol, butyl carbitol, pentanol, hexanol, terpene alcohols, ethylene glycol mono-n-propyl ether, diethylene glycol monoethyl ether, dipropylene glycol methyl ether, propylene glycol n-propyl ether, and combinations thereof.

19. The method of claim 1, wherein the polymer solution comprises a solvent or combination of solvents and the particle suspension comprises the same solvent or combination of solvents.

20. The method of claim 1, wherein the charged polymer is polyethylenimine and the charged particles are fluorinated silica particles.

21. The method of claim 1, wherein the sandstone formation is negatively charged before it is contacted with the polymer solution.

22. The method of claim 1, further comprising contacting the modified sandstone formation with a surfactant solution comprising a surfactant.

23. The method of claim 22, wherein the surfactant is present in the surfactant solution in an amount that ranges from about 0.1 weight percent to about 10 weight percent.

24. The method of claim 22, wherein the surfactant solution comprises a solvent selected from the group consisting of ethanol, isopropanol, ethylene glycol, butanol, 2-butoxyethanol, butyl carbitol, pentanol, hexanol, terpene alcohols, ethylene glycol mono-n-propyl ether, diethylene glycol monoethyl ether, dipropylene glycol methyl ether, propylene glycol n-propyl ether, and combinations thereof.

* * * * *